United States Patent
Finlayson

Patent Number: 6,145,226
Date of Patent: Nov. 14, 2000

[54] EAR TAG ASSEMBLY

[75] Inventor: Dorothy Elizabeth Finlayson, Alderley, Australia

[73] Assignee: Alfa Laval Agri AB, Tumba, Sweden

[21] Appl. No.: 09/202,031

[22] PCT Filed: Jun. 5, 1997

[86] PCT No.: PCT/AU97/00355

§ 371 Date: Feb. 22, 1999

§ 102(e) Date: Feb. 22, 1999

[87] PCT Pub. No.: WO97/46083

PCT Pub. Date: Dec. 11, 1997

[30]  Foreign Application Priority Data

Jun. 6, 1996 [AU] Australia ................................. P00322

[51] Int. Cl.$^7$ ................................................. A01K 11/00
[52] U.S. Cl. .................................................. 40/310
[58] Field of Search ...................................... 40/310

[56] References Cited

U.S. PATENT DOCUMENTS

| | | |
|---|---|---|
| D. 337,397 | 7/1993 | Kerola . |
| 3,900,981 | 8/1975 | Nichols ........................ 40/300 |
| 4,129,855 | 12/1978 | Rodrian . |
| 4,262,632 | 4/1981 | Hanton et al. . |
| 4,581,834 | 4/1986 | Zatkos et al. ................. 40/300 |
| 4,694,781 | 9/1987 | Howe et al. . |
| 4,718,697 | 1/1988 | Berardus van Amelsfort . |
| 4,798,175 | 1/1989 | Townsend et al. . |
| 5,308,351 | 5/1994 | Nehls ........................... 40/300 |
| 5,357,700 | 10/1994 | Schulte ......................... 40/300 |
| 5,461,807 | 10/1995 | Johnson . |
| 5,891,156 | 4/1999 | Gessner et al. ............... 606/117 |

FOREIGN PATENT DOCUMENTS

| | | |
|---|---|---|
| 665713 | 1/1996 | Australia . |
| 1168509 | 10/1969 | European Pat. Off. . |
| 7031318 | 2/1995 | Japan . |
| 2165723 | 4/1986 | United Kingdom . |
| 2181919 | 4/1987 | United Kingdom . |
| 2259631 | 3/1993 | United Kingdom . |
| WO8401688 | 5/1984 | WIPO . |
| WO8600498 | 1/1986 | WIPO . |
| WO9202127 | 2/1992 | WIPO . |
| WO9305648 | 4/1993 | WIPO . |
| WO9322907 | 11/1993 | WIPO . |
| WO9716963 | 5/1997 | WIPO . |

*Primary Examiner*—Cassandra H. Davis
*Attorney, Agent, or Firm*—Hovey, Williams, Timmons & Collins

[57] ABSTRACT

An ear tag assembly for attachment to an ear of an animal and for housing a transponder. The assembly comprises a body (1) and a pin (2). The body (1) comprises a chamber (11) in which the transponder is housed. A plug (3) closes the chamber (11). The body (1) is formed from hard plastics material and is generally cylindrical with a strengthening ridge (6) parallel to the long axis. The pin (2) comprises a narrow curved backing component (15) and a shaft (16) with a hardened end for penetrating the ear of the animal. The small size of the body (1), its location in the ear and the shape and material of the body (1) result in a durable ear tag assembly.

21 Claims, 2 Drawing Sheets

EAR TAG ASSEMBLY

This invention relates to an animal identification device and in particular to an ear tag assembly for attachment to an animal. The invention also relates to an improved attachment means for attaching the animal identification device to the ear of an animal.

DESCRIPTION OF THE PRIOR ART

Modern farming techniques require careful stock control including the ability to recognise individual animals. This has been achieved by tagging animals in identifiable ways. Known tagging methods include ear tags, ear clips and brands (normally applied to the rump). Although these methods provide identification they do not generally identify individual animals, nor do they permit rapid or automatic identification and remote recording.

Electronic identification devices have been developed to provide rapid and automatic identification and remote recording. These devices fall into two broad classes. Devices which are carried within the animal (either sub-cutaneously or internally) and those which are attached to the animal. Of the latter variety, those attached to the ear of animal are probably most prevalent.

An ear tag may serve two purposes. It may provide a visible indication by virtue of a distinctive colouring or numbering, and it may provide electronic identification by virtue of a transponder housed in the ear tag. In our co-pending application, Australian Patent Application Number 36640/95, an attachable transponder housing is disclosed which allows universal attachment of a transponder housing to known ear tag assemblies. Although the attachable transponder housing is useful with conventional numbered ear tags, it is preferable that a suitable ear tag housing and transponder be fitted in the first instance.

A number of ear tag assemblies housing transponders are known in the prior art but each suffers from one or more shortcomings. One such example is disclosed in International Application Number PCT/SE91/00476 in the name of Alfa-laval Agricultural International AB. This application discloses an animal identification device in which a transponder is moulded in a cavity in a hard capsule which in turn is moulded in a soft carrier material. The device is attached to the ear of an animal by a pin which passes through the ear and engages a boss formed in the carrier material.

A major failure mode of transponders is shock due to impact which results in damage to the internal components of the transponder, particularly the ferrite rod. The soft material of the Alfa-Laval device does not prevent damage to the hard casing or shock damage to the transponder. Furthermore, damage to the soft material can result in detachment of the device from the animal. Both situations result in a failure in the purpose of the device.

An ear tag must be able to withstand considerable pressure resulting from:

an hydraulic head bail applying several hundred pounds pressure;
 other animals chewing the ear tag;
 other animals standing on the ear tag;
 the ear tag being knocked against or by hard objects.

Another prior art ear tag assembly is described in International Patent Application Number PCT/NZ93/00037 in the name of Allflex New Zealand Limited. The Allflex ear tag has the transponder in a hard casing which is integrally moulded with a carrier which is preferably the female component of a two part ear tag. As with the Alfa-laval device, the Allflex device is subject to damage to the transponder as it is insufficiently protected in the polyurethane carrier. There is no shock protection provided and thus the electronics of the transponder may be damaged even though the external damage to the ear tag appears minimal.

Similar failure modes due to damage exist for the device described in U.S. Pat. No. 4718697 in the name of Allflex International Limited. The device disclosed in this patent has the transponder moulded in a hard bubble in the middle of rectangular tag. The tag hangs from the ear of an animal such that the transponder is in a position that is particularly susceptible to impact or pressure. The mechanical arrangement of this Allflex device does not provide the protection necessary to ensure long-term, damage-free operation of the transponder contained therein.

Another problem common to prior art ear tags is the tendency for ear injury to occur due to the tag or pin becoming caught on wire fences and the like. Most pins for ear tag attachment comprise a round button that seats against the rear of the ear. A pin projects through the ear from the button and engages with the tag. If the animal grazes near a fence (which is common) the wire of the fence can catch on either the tag or the button. As the animal pulls away the ear tag or pin may be damaged or the ear of the animal may be torn. Infection can then occur resulting in loss of all or part of the animals ear and probable loss of the ear tag and transponder. Furthermore, the infection causes the ear to be itchy so the animal rubs the ear further increasing the likelihood of the tag being lost or damaged.

The inventor is also aware that cases of infection behind ear tags are relatively common. This can occur soon after the ear tag is first applied and generally occurs under the button behind the ear. The inventor speculates that this is most likely due to restricted air flow around the button preventing healing of the wound caused when the ear tag is positioned.

A contributing factor to a number of the above identified problems is the size and location of the known ear tags. It would be advantageous to provide a smaller ear tag assembly which is located primarily within the ear.

SUMMARY OF THE INVENTION

It is an object of the present invention to provide an ear tag assembly overcoming one or more of the identified problems in the known prior art.

Further objects will be evident from the following description.

In one form, although it need not be the only or indeed the broadest form, the invention resides in an ear tag assembly for attachment to the ear of an animal comprising:

a body having a chamber therein for housing a transponder, said transponder being insertable into the chamber through at least one opening in the chamber;
 a plug for sealing said opening; and
 a pin insertable through the ear of the animal to engage the body, said pin and body acting cooperatively to retain the ear tag assembly on the ear of the animal;
 wherein said body is formed from hard plastics material and said body comprises a substantial cylindrical portion having a ridge projecting therefrom.

The ear tag assembly preferably further comprises cushioning means for surrounding the transponder in the chamber.

In preference the body further comprises a plate-like portion extending from the cylindrical portion, said plate like portion including an attachment aperture adapted to engage the pin with holding effect. The plate-like portion may further include a reinforcing rib.

The body suitably has a long axis less than 75 mm long and preferably less than 45 mm long. The diameter of the cylindrical portion is suitably about 10 mm.

The ear tag assembly is preferably formed from ultraviolet radiation resistant plastics material. The plastics material is suitably nylon. The material is preferably black to minimise absorption of ultraviolet radiation.

The ear tag assembly suitably includes a pressure equalising passage that allows pressure equalisation during insertion of the plug into the chamber. In one form the pressure equalising passage extends from one end of the plug to just short of the other end of the plug. Alternatively the passage may extend for the length of the plug.

There may be provided a circumferential ridge on the plug for engaging in a circumferential trough in the chamber for snap-lock engagement of the plug in the opening.

The pin preferably comprises a backing component and a shaft extending therefrom. The shaft may suitably be shaped at an end distal from the backing component to be engaged by the attachment aperture of the body with holding effect. The shaft of the pin preferably has a diameter less than the diameter of the aperture thereby allowing free rotation of the body on the shaft of the pin.

The distal end is preferably shaped to penetrate the ear of the animal to be tagged. The shape may be a point and the point may be suitably hardened.

The backing component may be flat but is preferably curved towards the ear so as to be concave with respect to the shaft. The backing component is suitably longer than it is wide with the width being approximately equivalent to that of the shaft in the vicinity of the backing component.

The backing component is preferably domed such that a region in the vicinity of the shaft is thicker than the perimeter.

The pin is suitably formed from the same hard plastics material as the body.

To assist in understanding the invention preferred embodiments will now be described with reference to the following figures in which.

In the drawings, like reference numerals refer to like parts.

Figure 1:
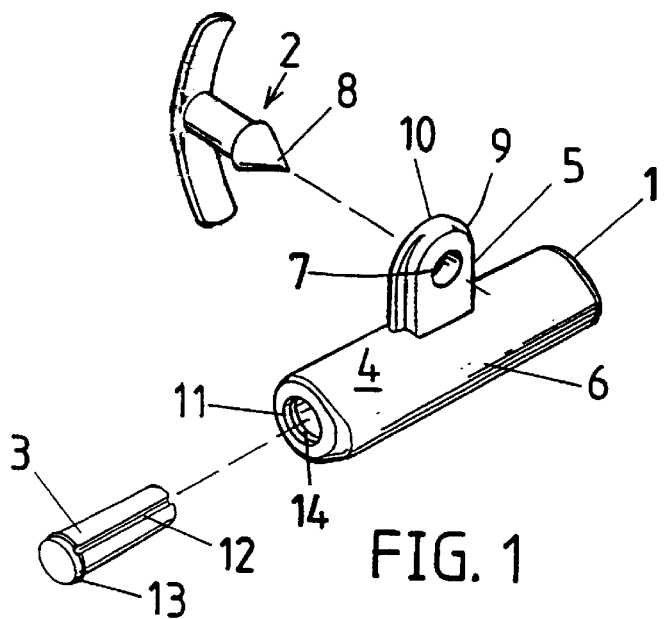
FIG. 1 is an exploded view of an ear tag assembly.
Figure 2:
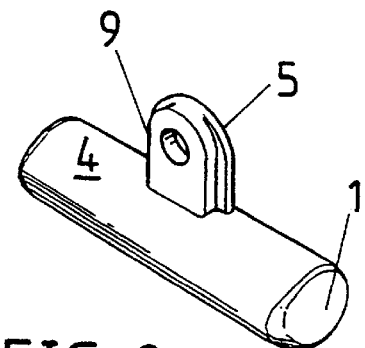
FIG. 2 is a sketch of the body of the ear tag assembly of FIG. 1 from a different angle.
Figure 9:
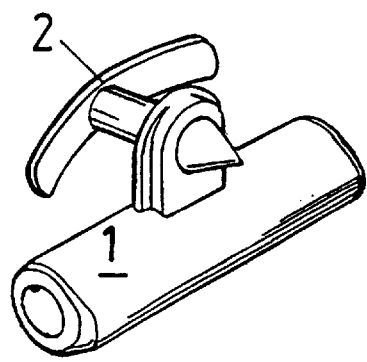
FIG. 9 is an assembled view of an ear tag assembly.

Referring to FIG. 1 and FIG. 9, there is shown an ear tag assembly comprising a body 1, pin 2 and plug 3. The body 1 comprises a generally cylindrical portion 4 and plate-like portion 5 extending therefrom. The cylindrical portion 4 has a ridge 6 projecting substantially along its length. The ridge 6 is integrally formed with the cylindrical portion 4.

Figure 3:
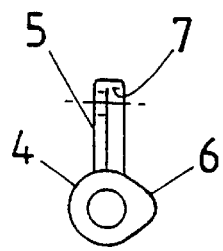
FIG. 3 is an end view of the body of FIG. 1.

As seen most clearly in FIG. 3 the cylindrical portion 4 is substantially circular in cross-section except for the substantially triangular ridge 6. The ridge 6 is rounded at its apex, thereby avoiding any problems associated with sharp edges and to provide resistance against crushing.

The plate-like portion 5 includes an aperture 7 for receiving the end 8 of the pin 2, as described in detail below. A rib 9 reinforces the plate-like portion 5. To minimise the possibility of snagging the rib 9 flows into the plate-like portion 5 in the vicinity of top region 10 without any edge or step. This minimises the opportunity for the tag to be snagged or caught as can occur with prior art tags.

A chamber 11 is formed in the body 1 for receiving a transponder (not shown). The chamber 11 is closed by inserting the plug 3 into the open end thereof. Because the chamber is closed the insertion of the plug would be prevented by compression of the air in the chamber. To overcome this problem the plug 3 includes a pressure equalising passage 12 that allows air to escape from the chamber while the plug is being inserted. The outer end of the pressure equalising passage is closed so that the final insertion of the plug seals the chamber.

Figure 6:
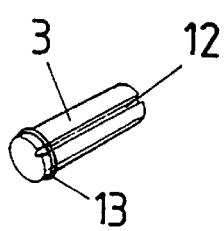
FIG. 6 is a sketch of an alternate form of the plug of FIG. 1.

In an alternate embodiment the pressure equalising passage may extend for the length of the plug 3, as depicted in FIG. 6.

To assist in retaining the plug 3 in the chamber 11 a circumferential ridge 13 is formed near the outer end of the plug. A corresponding circumferential trough 14 is formed in the inside surface of the chamber 11. The plug 3 is pushed into the chamber 11 until a snap-locking is achieved by the location of the ridge 13 in the trough 14. It will be appreciated that the circumferential ridge and trough can be replaced by other similar mechanisms such as one or more matching bumps and indentations.

The forming of a chamber closed by a plug allows the transponder to be inserted after manufacture of the ear tag. It also allows appropriate shock absorbing material to be inserted around the transponder. This cannot be adequately achieved if the transponder is moulded into the ear tag during the manufacturing process.

Figure 4:
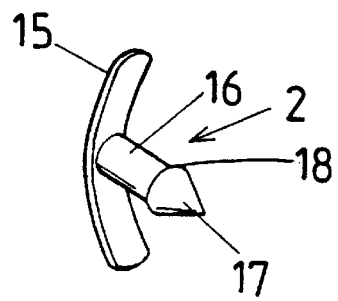
FIG. 4 is a sketch of the pin of FIG. 1.
Figure 5:
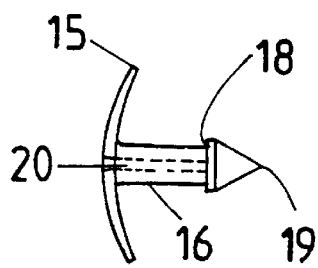
FIG. 5 is a side view of the pin of FIG. 4.

The pin 2 is shown most clearly in FIG. 4. The pin comprises a backing component 15 and a shaft 16 extending therefrom. The backing component 15 is curved towards the shaft 16 and slightly domed such that it is thicker in the vicinity of the shaft 16 than at the perimeter. The doming assists in deflecting snags from the backing component. The curvature of the backing component closely matches the curvature of the ear of the animal thereby minimising the gap between the backing component and the ear and minimise the possibility of the backing component becoming caught or snagged. Similarly, the chance of the ear tag being snagged is also reduced.

In one form the curved backing component may be resilient so that it deflects when the ear tag assembly is attached to the ear of an animal. Pressure is applied to the back of the ear by the backing component thereby pulling the backing component firmly against the ear.

The shaft 16 is shaped at an end 17 distal from the backing component 15 to be engaged with holding effect by the aperture 7 in the plate-like portion 5. The distal end 17 has a small step or ridge 18 which can be resiliently deformed under pressure to pass through the aperture 7 but is virtually impossible to withdraw. In fact, the pin must normally be cut for the tag to be removed from the animal.

The diameter of the shaft 16 is slightly less than the diameter of the aperture 7 so that the body 1 is able to rotate freely about the shaft 16. This further minimises the possibility of the tag being snagged since the tag will rotate and become unsnagged.

The pin 2 is self-piercing with the distal end 17 shaped to penetrate the ear of the animal to be tagged. The pin is formed from sufficiently hard material for the tip 19 to be able to penetrate the ear. If required, the tip 19 may be hardened further with a metal cap to assist in piercing the ear.

A conventional applicator punch (not shown) is used to attach the ear tag assembly to the animal. Known applicator punches use a stud that extends into an aperture in the back of the pin 2 to hold the pin. To facilitate the use of known applicator punches the shaft 16 of the pin 2 has a hole 20 provided therein for access of the stud from the rear. The hole 20 extends to the ridge 18 thus minimising the likelihood of the shaft 16 bending during application.

The backing component 15 is elongate rather than round as in prior art pins. An elongate backing component facilitates the flow of air behind the ear and minimises the opportunity for snagging. If the backing component does engage a snag it can easily rotate and unsnag. As described above, the diameter of the shaft 16 is smaller than the aperture 7 in the plate-like portion 5 of the body 1 to facilitate easy rotation. The narrow width of the backing component 15 also facilitates air flow around the ear of the animal where it is penetrated by the shaft of the pin. The inventors are aware that infection around the pin of known ear tag assemblies is prevalent. Allowing circulation of air reduces the incidence of infection.

The body is made from hard plastics material to provide strength and to protect the transponder. The ridge 6 provides further strength and protection against pressure. As mentioned above, the body 1 must withstand considerable pressure in normal circumstances and very high pressure in unusual circumstances. Normal livestock conditions are harsh and cause failure of known transponders.

Figure 7:
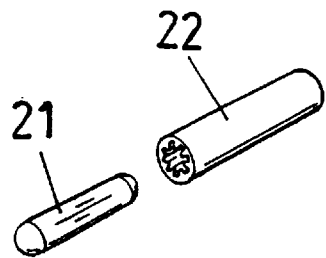
FIG. 7 is a sketch of a transponder suitable for use in the ear tag assembly of FIG. 1.

To further protect the transponder 21 it is located in a surrounding cushioning sheath 22, as shown in FIG. 7, prior to loading the transponder 21 into the chamber 11. The cushioning sheath 21 provides shock protection for the transponder. Although the cushioning sheath 21 is shown as an extruded member it may also be in the form of a grease or expanding foam. It will be appreciated that the transponder is protected against damage by the combination of the hard body of the ear tag and the cushioning of the transponder within the body. This arrangement has been reached by the inventors after considerable experimentation and trial.

The plastic from which the ear tag assembly is formed is UV resistant to increase its lifetime. The inventors have found that one failure mode of known ear tag assemblies is associated with the body becoming brittle due to hardening of the plastic from exposure to ultraviolet radiation. Other failure modes are due to the tag being made from soft plastic which offers too much flexibility, or hard plastic too close to the transponder which transmits shocks.

The location of the ear tag assembly on the animal means that the tag is exposed to high dosages of UV radiation. The effect of UV radiation is minimised by using UV resistant material. The inventors have found that nylon is a suitable material although other materials, such as polycarbonates, may also be suitable. The effect of UV can be further ameliorated by using black material.

The pin may suitably be formed from the same hard, UV resistant material as the body.

Figure 8:
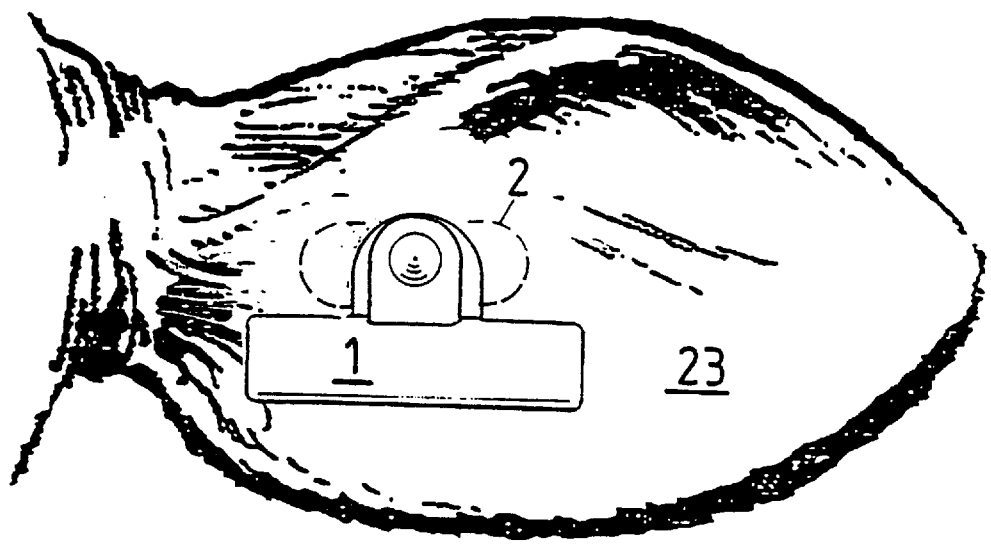
FIG. 8 is a sketch of the ear tag assembly of FIG. 1 applied to the ear of an animal.

The location of the ear tag assembly on the ear 23 of an animal is shown in FIG. 8. It will be appreciated that the size and shape of the body 1 of the ear tag assembly is particularly advantagous for minimising the opportunity for the ear tag assembly to become snagged. Furthermore, the shape of the pin 2 also minimises the opportunity for snagging. The inventors have found that the body only needs to be moderately larger than the transponder it houses. A body having a long axis less than 75 mm is easily achievable. The inventors have found that the preferred size is a body having a long axis less than 45 mm long. The diameter of the body is suitably around 10 mm.

Throughout the specification the aim has been to describe the preferred embodiments of the invention without limiting the invention to any one embodiment or specific collection of features.

What is claimed is:

1. An ear tag assembly for attachment to the ear of an animal comprising:

a body having a chamber therein for housing a transponder, said transponder being insertable into the chamber through at least one opening in the chamber;

a plug for sealing said opening; and a pin insertable through the ear of the animal to engage the body, said pin and body acting cooperatively to retain the ear tag assembly on the ear of the animal;

wherein said body is formed from hard plastics material and said body comprises a substantially cylindrical portion forming said housing and a plate portion extending from the cylindrical portion and including an attachment aperture to engage the pin with a holding effect; and wherein said substantially cylindrical portion has a ridge projecting therefrom and extending substantially along the length of said cylindrical portion.

2. The ear tag assembly of claim 1 further comprising cushioning means for surrounding the transponder in the chamber.

3. The ear tag assembly of claim 1 wherein the body further comprises a plate portion extending from the cylindrical portion, said plate portion including an attachment aperture adapted to engage the pin with holding effect.

4. The ear tag assembly of claim 3 wherein the plate portion further comprises a reinforcing rib.

5. The ear tag assembly of claim 1 formed from ultraviolet radiation resistant plastics material.

6. The ear tag assembly of claim 5 wherein the plastics material is nylon.

7. The ear tag assembly of claim 5 wherein the plastics material is black to minimise absorption of ultraviolet radiation.

8. The ear tag assembly of claim 1 further comprising a pressure equalising passage that allows pressure equalisation during insertion of the plug into the chamber.

9. The ear tag assembly of claim 8 wherein the pressure equalising passage extends from one end of the plug to just short of the other end of the plug.

10. The ear tag assembly of claim 8 wherein the pressure equalising passage extends for the length of the plug.

11. The ear tag assembly of claim 1 further comprising a circumferential ridge on the plug for engaging in a circumferential trough in the chamber for snap-lock engagement of the plug in the opening.

12. The ear tag assembly of claim 1 wherein the pin comprises a backing component and a shaft extending therefrom.

13. The ear tag assembly of claim 12 wherein the shaft is shaped at an end distal from the backing component to be engaged by the attachment aperture of the body with holding effect.

14. The ear tag assembly of claim 12 wherein the shaft of the pin has a diameter less than the diameter of the aperture thereby allowing free rotation of the body on the shaft of the pin.

15. The ear tag assembly of claim 12 wherein an inner surface of the backing component is curved towards the ear so as to be concave with respect to the shafted.

16. The ear tag assembly of claim 12 wherein the backing component is longer than it is wide with the width being approximately equivalent to that of the shaft in the vicinity of the backing component.

17. The ear tag assembly of claim 12 wherein an inner surface of the backing component is curved such that a region in the vicinity of the shaft is thicker than the perimeter.

18. The ear tag assembly of claim 1 wherein the distal end of the pin is shaped to penetrate the ear of the animal to be tagged.

19. The ear tag assembly of claim 15 wherein the shape is a point and the point is suitably hardened.

20. The ear tag assembly of claim 1 wherein the pin is formed from the same hard plastics material as the body.

21. The ear tag assembly of claim 1 wherein the body has a long axis less than 45 mm long and a diameter of about 10 mm.

* * * * *